United States Patent [19]  
Taylor

[11] 4,301,884  
[45] Nov. 24, 1981

[54] TRACK SUSPENSION AND DRIVE FOR SNOWMOBILE

[76] Inventor: Jerry L. Taylor, 148 Juniper St., Madras, Oreg. 97741

[21] Appl. No.: 93,066

[22] Filed: Nov. 13, 1979

[51] Int. Cl.³ ............................................. B62M 27/02
[52] U.S. Cl. .................................. 180/190; 180/9.58; 305/25
[58] Field of Search .............. 180/190, 191, 193, 184, 180/185, 9.58; 305/25

[56] References Cited

U.S. PATENT DOCUMENTS

| | | | |
|---|---|---|---|
| 2,323,526 | 7/1943 | Eliason | 180/193 X |
| 3,404,745 | 10/1968 | Smieja | 180/193 |
| 3,658,145 | 4/1972 | Bergman et al. | 180/190 |
| 3,690,394 | 9/1972 | Skime | 180/193 X |
| 3,719,242 | 3/1973 | Duclo | 305/25 X |
| 3,738,714 | 6/1973 | Ness | 180/193 X |
| 3,758,170 | 9/1973 | Mazurek | 305/35 EB |
| 3,773,126 | 11/1973 | Irvine | 180/9.58 |
| 3,856,099 | 12/1974 | Bowers | 180/193 |
| 3,930,689 | 1/1976 | Maki | 305/35 EB |
| 3,974,890 | 8/1976 | Noble | 180/193 |

OTHER PUBLICATIONS

What's New in Suspensions, Nelson, SnoTrack, 1/1974, pp. 34–36.
Yamaha SRX 340, 440, Owner's Service Manual, Yamaha Motor Co., Ltd., pp. 2–3, 24–28, 31–33, 51, 8/1975.
Yamaha 440, Advertisment.
Yamaha GP338F and GP-443F, Advertisements, 2 shts.

*Primary Examiner*—John A. Pekar
*Attorney, Agent, or Firm*—Klarquist, Sparkman, Campbell, Leigh, Whinston & Dellett

[57] ABSTRACT

A snowmobile track suspension subframe of the slide rail type carries a track drive axle at its forward end. Such axle mounts both the track drive sprockets and the driven sprocket of a track drive chain assembly so that the entire track suspension subframe assembly, including its forward drive end, is capable of movement independently of the main frame.

12 Claims, 9 Drawing Figures

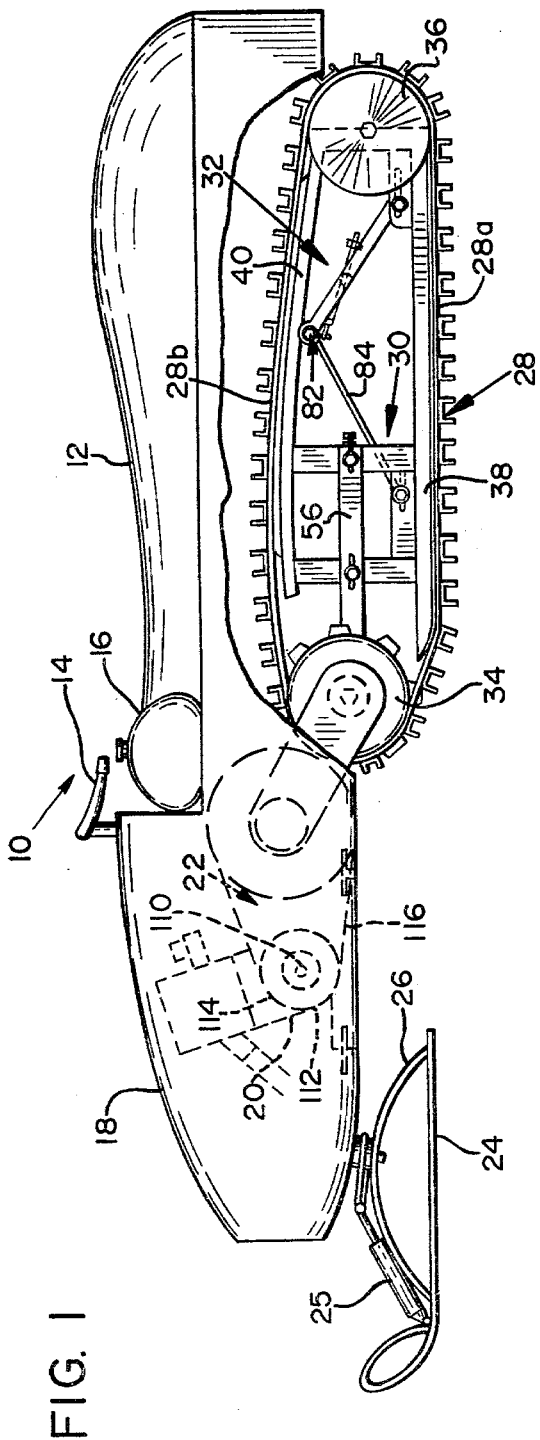
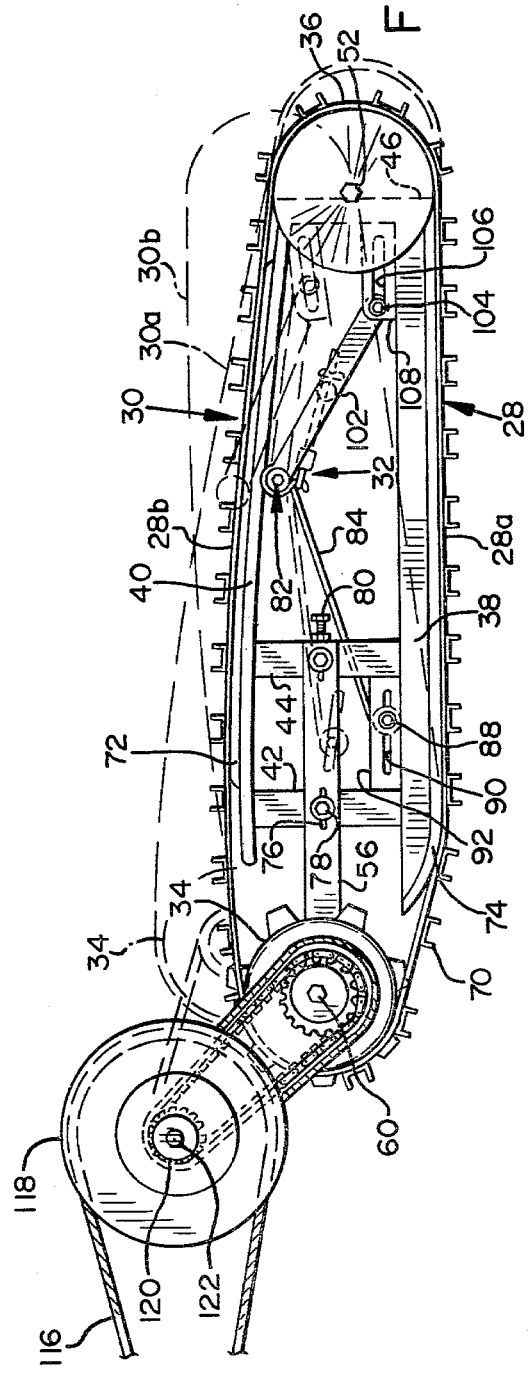

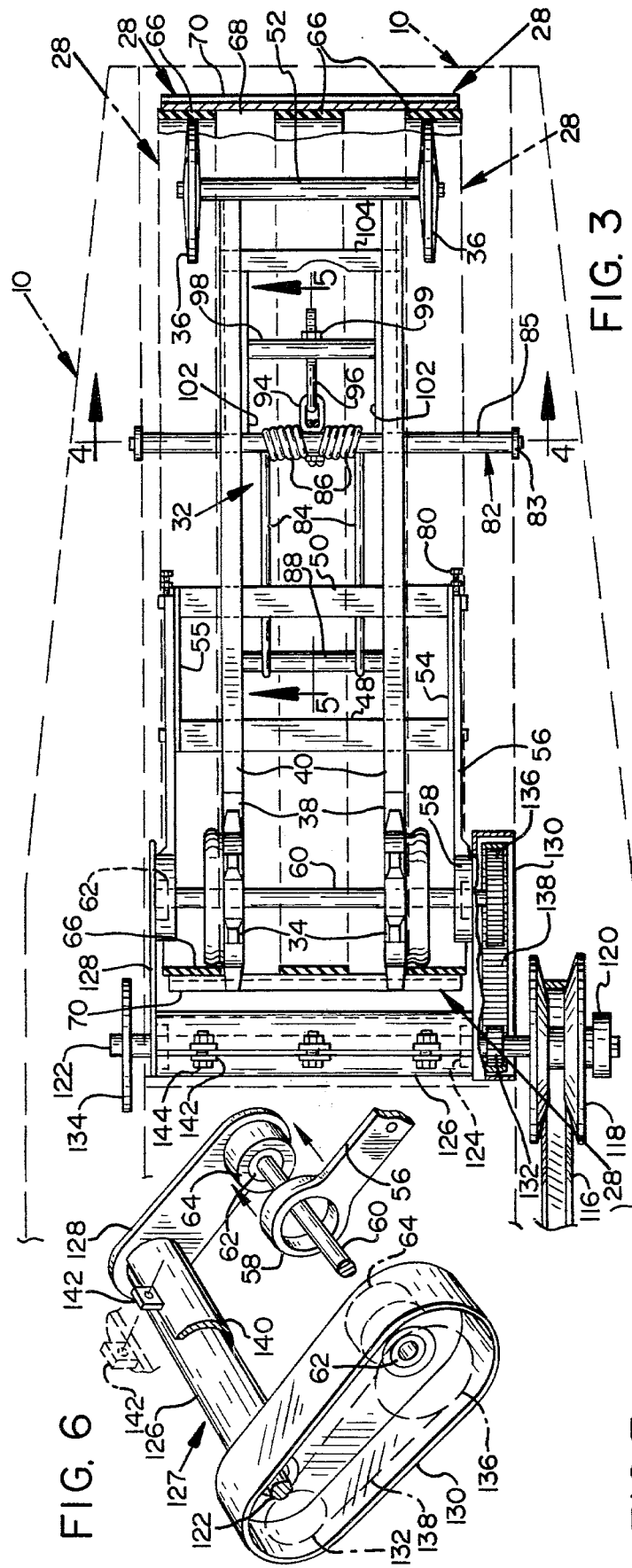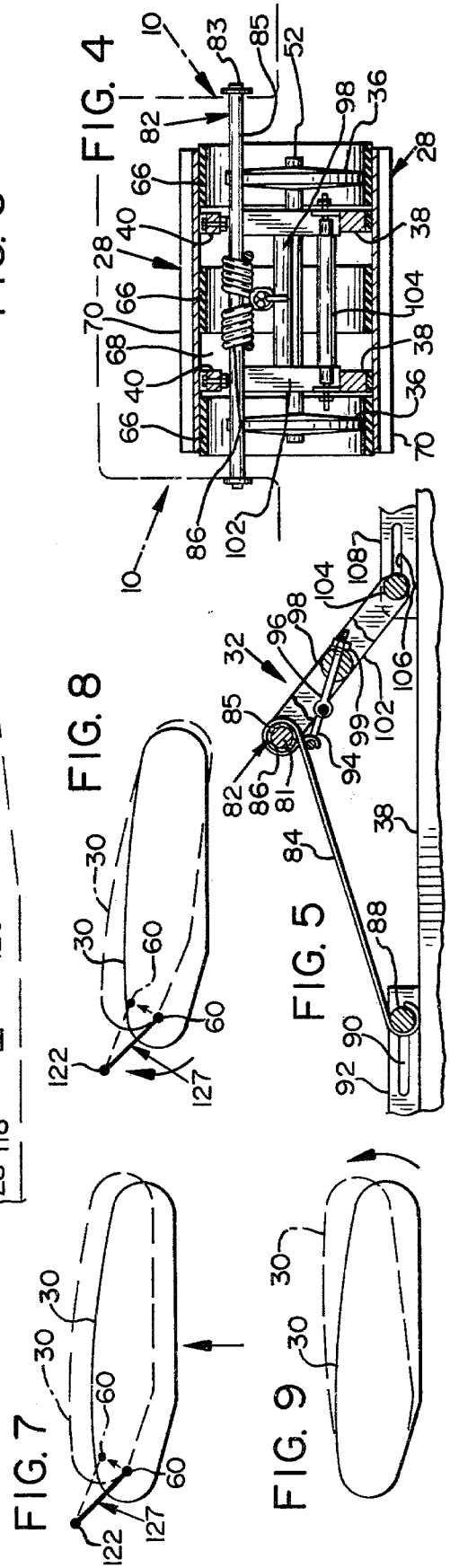

TRACK SUSPENSION AND DRIVE FOR SNOWMOBILE

BACKGROUND OF THE INVENTION

1. Field of the Invention

The present invention relates to endless track vehicles, and more particularly to a track suspension and drive system for a snowmobile.

2. Description of the Prior Art

Snowmobiles typically have a front steering ski and an endless drive track carried by a subframe rearwardly of the ski, with the subframe being resiliently suspended from the main frame of the snowmobile. The track suspension system of a snowmobile is important because it determines, at least to some extent, the vehicle's shock-absorbing capability, stability, handling, traction, and power requirements.

Snowmobile track suspension systems are of three general types. One type is a bogie wheel suspension, in which sets of bogie wheels carried by axles mounted on a resiliently suspended subframe engage the lower run of the drive track so as to tend to maintain the track in driving engagement with the snow. The advantage of this system is that there is mostly only rolling friction, with very little sliding friction between the bogie wheels and the track, thereby requiring little, if any, lubrication. Typical bogie wheel suspensions are shown, for example, in U.S. Pat. Nos. 3,773,126 and 3,658,145.

A second type of track suspension system is the slide rail suspension, in which the lower run of the drive track travels in sliding engagement with a pair of longitudinally extending rails. Snow acts as a lubricant between the track and rails to reduce friction. The advantage of a slide rail suspension over a bogie wheel suspension is that the former tends to hold the track flatter against the snow in rough or variable terrain, which can be important when speed or power is required, such as in racing. Typical slide rail suspensions are shown, for example, in U.S. Pat. Nos. 3,690,394; 3,738,714; 3,974,890; and 3,758,170.

A third type of track suspension system is a combination of the slide rail and bogie wheel suspensions in a single subframe assembly. Bogie wheels act to hold at least portions of the lower run of the track away from the slide rail to reduce sliding friction. Yamaha and Scorpion are known manufacturers of combination slide rail-bogie wheel track suspension systems.

A good discussion of the various snowmobile track suspension systems appears in an article entitled "What's New in Suspensions", by Lars Nelson, on Pages 34–36 of the Jan. 1974 edition of *Snowtrack Magazine*.

In most known track suspension systems of either the bogie wheel, slide rail, or combination type, the bogie wheels and slide rails are carried by a subframe which is independent of the snowmobile's main frame but resiliently suspended therefrom, so as to provide shock-absorbing capability and thereby isolate the main frame from much terrain-induced shock. The track on such subframes is driven by a pair of drive sprockets mounted on a drive axle. The drive axle is carried by the main frame of the snowmobile, as shown in all of the aforementioned patents. While the track drive axle and sprockets are located at one end of the track, there is usually an idler axle carrying a set of idler or guide wheels at the opposite end of the track. Often, the idler axle is also carried by the main frame. Therefore, the resilient means which suspends the subframe from the main frame does not isolate the entire length of the track from the main frame, resulting in some shock being transmitted through the fore and aft portions of the track and its axles to the main frame.

With the drive axle and sometimes the idler axle being mounted on the main frame, upward deflection of the track-carrying subframe relative to the main frame as permitted by the resilient suspension changes the track configuration. This causes the track to develop slack, resulting in a so-called "ripple" effect and vibration which can cause a momentary loss of driving power and increase track wear.

In addition, with the drive axle and sometimes the idler axle being mounted to the main frame, the over-all length of the track must be substantial in order to lay a desired flat length of track on the snow. The overall length of the track affects the total weight of the vehicle, the amount of power required to drive the track, and the effective distance between the track and steering skis (wheelbase). In general, the greater the wheelbase, the greater will be the maneuverability and responsiveness of a snowmobile of any given length, at least at high speeds.

With existing snowmobile track suspensions having main frame-mounted drive axles, the engine must be mounted generally vertically above the drive axle because of space limitations on the main frame and limitations on over-all vehicle length, the latter being dictated by a desire to control total vehicle weight. However, when the engine is mounted above the drive axle the vehicle has a relatively high center of gravity, which is undesirable, particularly in racing, which is usually conducted on oval tracks.

In view of the foregoing, there is a need for an improved track suspension and drive system for snowmobiles which will eliminate or alleviate the foregoing disadvantages of existing such systems.

SUMMARY OF THE INVENTION

The present invention is a track suspension and drive system for snowmobiles in which both the track drive axle and the track idler axle are carried by the subframe rather than the main frame. This enables isolation of the entire drive track from the main frame by means of the resiliently suspended subframe. It also enables upward deflection of all portions of the track with respect to the main frame while maintaining a constant track configuration. A subframe-mounted drive axle also enables use of a shorter track for less weight and lower power requirements, and lower and more rearward mounting of the engine on the main frame for a lower center of gravity and better balance.

One of the problems, however, in mounting the drive axle on the subframe is transmitting power to such axle from the drive train on the main frame while still isolating the frame from shock loading of the subframe. In the present invention, this problem is solved by a unique, articulated drive assembly which transmits power from the prime mover on the main frame to the drive axle on the subframe while permitting relative vertical movement between the drive components on the main and subframes so as to maintain the overall resiliency of the subframe relative to the main frame.

Another feature of the invention is the use of slide rails along the upper as well as the lower run of the track to reduce track flutter and vibration.

Primary objects and advantages of the invention are:

to provide an improved track suspension and drive system for a snowmobile;

to provide a track suspension and drive system for a snowmobile having improved shock-absorbing capabilities;

to reduce drive track flutter and vibration and thus momentary loss of driving power and track wear by providing a suspension and drive system which maintains a constant track configuration during all modes of deflection of the subframe in rough terrain;

to aid in the reduction of drive track flutter and vibration by providing upper as well as lower slide rails for the drive track;

to reduce total vehicle weight and thus the power required to drive the vehicle by reducing the overall length of the drive track;

to reduce the overall length of the drive track without reducing the driving surface area of the track;

to lower the center of gravity of the vehicle and improve vehicle balance by mounting the vehicle's engine lower and more rearwardly on the main frame than heretofore possible;

to increase the effective wheelbase of a snowmobile without increasing the overall length of the vehicle for improved maneuverability and responsiveness;

to provide an improved track suspension and drive system which enables mounting the track drive axle on the subframe rather than on the main frame, thereby making all of the fore-going objectives possible;

to provide an improved track suspension and drive system which enables mounting the track drive axle on the subframe while still isolating the subframe from the main frame;

to provide an improved track suspension and drive system for a snowmobile which is less costly to manufacture and maintain, and is of simplified construction through reduction in the number and complexity of components in the suspension and drive system; and to provide a snowmobile which is lighter in weight, less expensive to build, operate and maintain, and better riding and handling as compared to prior snowmobiles.

The drive and suspension system of the invention features a track suspension subframe which mounts both the track drive axle and the track idler axle at opposite ends of the frame and includes an upper pair of slide rails as well as a lower pair of slide rails for reducing track flutter and maintaining a constant track configuration in all positions of the subframe relative to the main frame. The drive means for transmitting power from the prime mover on the main frame to the drive axle on the subframe includes a flexible endless drive member extending between drive elements on the main frame and subframe, and, in addition, an articulated connecting means interconnecting the main frame and subframe in a manner to maintain tension on the flexible endless drive member while enabling relative vertical movement between the main frame and subframe at the driving interconnection therebetween.

The foregoing and other objects, features and advantages of the present invention will become more apparent from the following detailed description, which proceeds with reference to the accompanying drawings.

BRIEF DESCRIPTION OF DRAWINGS

In the drawings:

FIG. 1 is a side elevational view of a snowmobile having a body portion of its main frame broken away to reveal the track suspension subframe portion of the vehicle;

FIG. 2 is an enlarged side elevational view of the track suspension and drive system of the snowmobile of FIG. 1 on an enlarged scale;

FIG. 3 is a top plan view of the track suspension and drive system of the snowmobile of FIG. 1 on approximately the same scale as FIG. 2;

FIG. 4 is a vertical cross-sectional view taken along the line 4—4 of FIG. 3;

FIG. 5 is a vertical longitudinal sectional view taken along the line 5—5 of FIG. 3;

FIG. 6 is a partially exploded and somewhat schematic perspective view of the articulated drive assembly portion of the track suspension and drive system of the invention in the region where the drive train extends between the main frame and subframe; and FIGS. 7, 8 and 9 are schematic side elevational views illustrating upward deflection of the vehicle track under varying terrain conditions.

DETAILED DESCRIPTION OF A PREFERRED EMBODIMENT

General Assembly

With reference to FIG. 1 of the drawings, a snowmobile having a track suspension and drive system in accordance with the invention, includes a main frame 10, a seat 12, a steering handle 14 and a fuel tank 16. Forwardly of the steering handle is a shroud or hood portion 18 housing an engine compartment including an engine 20 and a drive train indicated generally at 22. The main frame is ground-supported by a pair of steering skis 24 at its forward end. Each ski includes a ski damper 25 and a ski spring 26, and is of conventional construction. The rear portion of the main frame is supported by an endless drive track 28, which is carried by a subframe 30 suspended from the main frame by a resilient suspension means indicated generally at 32.

Track 28 is driven by a pair of track drive sprockets 34 at the forward end of the subframe and rides over a pair of idler or guide wheels 36 at the rear end of the subframe. Between the drive sprockets and idler wheels, a lower run 28a of the track rides over a pair of transversely spaced lower slide rails 38. An upper run 28b of the track rides over a similar pair of upper slide rails 40. The upper and lower slide rails form part of the subframe assembly.

Track Suspension Subframe

The track suspension subframe will be described in detail primarily with reference to FIGS. 2 and 3.

The upper and lower pairs of slide rails 40,38 are maintained a desired vertical distance apart by forward vertical frame members 42,44 and rear vertical frame members 46, only one of each of which is shown in FIG. 2. The transverse spacing between the lower pair of slide rails 38 and between the upper pair of slide rails 40 is maintained by horizontal cross frame members 48,50 at the forward portion of the subframe and by an idler wheel axle 52 carried by the rear vertical frame members 46 at the rear of the subframe. Thus, the subframe is generally of open box frame construction and includes the upper and lower slide rails as its principal longitudinal frame members.

As shown best in FIG. 3, the opposite ends of cross frame members 48,50 extend laterally beyond the upper and lower slide rails and are joined at their opposite outer ends by connecting frame members 54,55. The rear portions of a pair of bearing support arms 56 are bolted to the connecting frame members 54,55. Arms 56 extend forwardly from the cross frame member 48 and include an enlarged annular boss 58 at their forward ends. These bosses serve as bearings for opposite ends of an articulated connecting means for a drive assembly which interconnects the drive transmission on the main frame with a drive axle 60 of the subframe, and also serve as supports for the opposite ends of drive axle 60. The details of the articulated connecting means for the drive assembly are shown in FIG. 6 and will be described in greater detail hereinafter. Drive axle 60 is rotatably mounted at its opposite ends in bearings 62, shown in FIGS. 3 and 6, which in turn are carried by cylindrical bearing hubs 64 of the articulated connecting means. These hubs in turn are received within the annular bearing bosses 58 of arms 56.

Drive axle 60 mounts the pair of drive sprockets 34, which in turn drivingly engage track 28. Track 28 is of conventional construction well known in the field, and, as shown best in FIG. 4, includes a series of three transversely spaced, flat endless flexible rubber belts 66 providing gaps 68 therebetween. The three belts 66 are joined together by transverse metal channel-shaped cleats 70. The teeth of drive sprockets 34 extend into gaps 68 to drivingly engage the cleats and thereby drive the track assembly. At the rear end of the subframe the outer belt portions of the track assembly ride over idler wheels 36.

Between the front drive sprockets and rear idler wheels, track cleats 70 ride along the upper and lower slide rails 38,40, which help maintain the track in a predetermined configuration during upward deflection of various portions of the track as shown in FIGS. 7–9. This feature helps prevent slack from developing along the upper run of track, thereby helping to minimize track vibration and flutter, and thus loss of tractive power, during deflection of the subframe. Considerable sliding friction is generated as the track cleats 70 ride over the slide rails, and particularly the lower slide rail. To minimize such friction, both the upper and lower slide rails have their outer cleat-engaging surfaces covered with a nylon or other low-friction plastic slide member 72,74, respectively.

These slides are naturally cooled and lubricated by the snow as the track is driven.

The subframe also has track takeup means to maintain a desired track tension. Such means includes takeup slots 76 in the bearing support arms 56 through which connecting bolts 78 extend to connect such arms to frame members 54,55. Set screws 80 carried by nut members on vertical frame members 44 engage the rear ends of bearing support arms 56. When the set screws are rotated in a clockwise direction with connecting bolts 78 loosened, tension on the track increases through forward movement of bearing support arms 56 and the connected drive axle 60 and axle-supported drive sprockets 34. When the desired track tension is obtained, connecting bolts 78 are tightened to hold the tension.

Subframe Suspension

Subframe 30 as described is resiliently suspended from the main frame by the previously mentioned resilient suspension means, indicated generally at 32 in FIGS. 1, 2 and 3. The details of the suspension means are shown best in FIGS. 2, 3 and 5. A suspension shaft means 82 includes a solid shaft 81 which extends through an open intermediate portion of the subframe and is anchored at its opposite ends 83 to main frame 10. A tubular shaft 85 is freely rotatable on the shaft 81 (FIG. 5) and is nearly coextensive therewith. A pair of torsion springs 84 have one set of end portions 86 wrapped about a central portion of hollow shaft 85. The torsion springs extend diagonally downwardly and forwardly from the suspension shaft means and are anchored at their opposite ends to a cross shaft 88 (FIGS. 3 and 5) on a lower forward portion of the subframe. Cross shaft 88 is slidably mounted at its opposite ends within horizontal slots 90 of spring mounting brackets 92 carried by forward portions of the lower slide rails 38.

As shown best in FIGS. 3 and 5, the free ends of coiled spring end portions 86 are anchored by a link 94 to an eye bolt 96. The shaft of bolt 96 extends through a transverse shaft 98 and is secured to such shaft by a nut 99. Transverse shaft 98 is attached at its opposite ends to a pair of swing arms 102 which are connected at their upper ends to suspension shaft 85 and at their lower ends to the subframe. Eye bolt 96 serves as a spring tension adjustment means. By taking up threads of eye bolt 96 with nut 99, the effective tension of torsion springs 84 is increased, thereby increasing the tendency of the torsion springs to hold the forward portion of the track and subframe on the ground and to return them to ground engagement when deflected upwardly as shown in FIG. 8. From the foregoing it will be apparent that torsion springs 84 serve to resist upward deflection of forward portions of the subframe, including the track, from the snow and to return it to the snow after any such deflection.

Swing arms 102 extend diagonally downwardly and rearwardly from a rigid connection with suspension shaft 85 and are fixed at their lower ends to a cross shaft 104. The opposite ends of such shaft are slidably mounted within slots 106 of brackets 108 fixed to the upper rear ends of lower slide rails 38. Swing arms 102, acting in conjunction with suspension shaft 82, torsion spring 84, and spring tensioning means 94,96, urge the rear portion of the subframe and connected track portion downwardly against the snow surface.

The function of slots 90 and 106 in spring brackets 92 and swing arm brackets 108, respectively, will be evident from FIG. 2, comparing the normal full line position 30 of the track suspension subframe with the deflected, dashed line positions 30a, 30b of such subframe. As a front portion of the subframe is deflected upwardly and rearwardly by the terrain to a position 30a, the lower ends of torsion spring 84 deflect upwardly also, while their upper ends attached to the main frame remain relatively stationary, causing the springs to store energy and the spring shaft 88 to slide forwardly in slots 90 of brackets 92. When the upward deflecting force is removed, the springs quickly return the forward frame and track portions to the snow surface, and shaft 88 slides rearwardly in slots 90. Slots 90 thus serve as a lost motion means to prevent the torsion springs from bending or breaking during their upward deflection.

Similarly, as the rear portion of the subframe is deflected upwardly to position 30b relative to the main frame, and particularly relative to main frame suspension shaft 82, the distance between the swing arm bracket 108 and suspension shaft 82 is reduced. As a consequence, swing arm mounting shaft 104 slides rearwardly along slots 106, thereby avoiding bending or breaking the swing arms. Thus, the lost motion or free play permitted by slots 90 and 106 of brackets 92 and 108 is important to ensure proper operation of the resilient suspension means without damage.

From the foregoing it will be apparent that suspension shaft 82 comprises a single-axis suspension of the subframe from the main frame via the resilient suspension means described.

Track Drive Assembly

Because engine 20 and a major portion of drive train 22 for track assembly 28 is carried by the main frame, but track drive axle 60 and its supported drive sprockets 34 are carried by the subframe, interconnecting drive means are provided to drivingly interconnect the drive train on the main frame with the drive axle on the subframe. The interconnecting drive means includes a rigid but articulated drive assembly which enables upward and rearward deflection of the drive axle and connected drive components of the subframe relative to the main frame while the drive train performs its driving function and without interruption of power transmission to the drive axle. The details of such interconnecting drive means, including the articulated drive assembly, are shown best in FIGS. 2, 3 and 6.

With reference to FIG. 1, drive train 22 on the main frame includes a drive shaft 110 from the engine connected to a driving clutch 112. Clutch 112 carries a pulley wheel 114. A drive belt 116 extends between pulley wheel 114 and a larger pulley wheel 118 mounted on the input shaft of a driven clutch 120. Power is transmitted from the driven clutch to an output or driven shaft 122. Driven shaft 122 is journaled in bearings 124. Bearings 124 are carried with opposite ends of a pivot tube portion 126 of the articulated drive assembly 127 for interconnecting the main frame and subframe at their driving interconnection. Such articulated drive assembly includes, in addition to pivot tube 126, a pivot arm 128 affixed to one end of the pivot tube, and a pivot housing 130 affixed to the opposite end of the pivot tube.

Driven shaft 122 carries a small chain sprocket 132 near one end within pivot housing 130 and carries a brake disk 134 at its opposite end. Drive axle 60 on the subframe carries a larger chain sprocket 136 within pivot housing 130. The sprockets 132, 136 are interconnected by a drive chain 138 within housing 130. Drive chain 138 comprises an endless flexible drive means which drivingly interconnects the drive components of the main frame and subframe. The rigid but articulated drive assembly 127 enables the interconnecting flexible drive chain to function by maintaining chain tension between the drive and driven sprockets while also enabling the forward portion of the subframe to deflect upwardly and rearwardly relative to the main frame, in the following manner.

Referring to FIG. 6, both pivot arm 128 and pivot housing 130 carry cylindrical bearing hubs 65 at their inside faces, each such hub housing a bearing 62 which journals the drive axle 60. The opposite ends of pivot arm 128 and pivot housing 130 are rigidly interconnected by pivot tube 126. The pivot tube 126 is in turn pivotally connected to the main frame by a sleeve bearing 140 having a series of ears 142 by means of which the sleeve bearing is affixed rigidly to the main frame using fasteners 144. Thus, pivot tube 126 is free to pivot within sleeve bearing 140, whereby the entire articulated drive assembly can pivot about the axis of driven shaft 122 relative to the main frame. At the opposite, subframe end of the articulated assembly, hubs 64 are journaled within the annular bosses 58 of bearing support arms 56 of the subframe whereby the entire articulated drive assembly can also pivot about the axis of track drive axle 60.

With the foregoing drive arrangement, the subframe is free to articulate in a generally vertical direction relative to the main frame about the axes of the driven shaft 122 on the main frame and the drive axle 60 on the subframe. The articulated drive assembly thus serves as articulation means which permits the described relative movement between the main frame and subframe while maintaining the driving interconnection between the power train elements of the two frames.

As will be evident from FIGS. 1 and 2, driven shaft 122 is disposed upwardly and forwardly at generally about a 45° angle from the drive axle 60. This ensures that pulley wheel 118 will have sufficient ground clearance when the forward portions of the track and subframe are deflected upwardly. This feature together with the rigid articulated connection 127 between the main frame and subframe causes the forward portion of the subframe and track to swing rearwardly as well as upwardly when deflected, as shown best in FIGS. 2, 7 and 8.

Operation

An important feature of the track suspension and drive system described is its ability to maintain a constant track configuration in all positions of the subframe relative to the main frame. FIGS. 7-9 illustrate such feature. In FIG. 7 the bottom of subframe 30 is subjected to an upward shock load at midlength, indicated by the arrow. As a result, the entire subframe swings momentarily upwardly and rearwardly as a unit about the axis of shaft 122, guided by the rigid articulation means 127 relative to the main frame, from its solid line position to its dashed line position, returning quickly, however, to its solid line position under the influence of the resilient suspension means. It should be noted, however, that the overall configuration of the track does not change during such deflection, minimizing tractive power loss due to track flutter or vibration. The same is true during upward deflections of the forward portion only of the subframe, as illustrated in FIG. 8. When only the rear end is deflected upwardly as shown in FIG. 9, the forward portion of the track maintains ground contact.

Having illustrated and described the principles of my invention by what is presently a preferred embodiment, it should be apparent to persons skilled in the art that the invention may be modified in arrangement and detail without departing from such principles. As an example, the invention may be applied to a bogie wheel suspension system or to a combination bogie wheel-slide rail system to advantage. I claim as my invention all such modifications as come within the true spirit and scope of the following claims.

I claim:

1. An endless track snowmobile vehicle comprising:

a main frame, steerable ski means depending from a forward portion of said main frame, a subframe mounting an endless track, resilient suspension means interconnecting said main frame and said subframe such that said subframe and track extend below said main frame throughout the length of said subframe, whereby said steerable ski means and endless track provide the sole means of support of said main frame on snow and other support surfaces under most new snow conditions, a track drive sprocket means drivingly engaging said endless track, and a drive axle mounting said track drive sprocket means, said drive axle being mounted on said subframe, said ski means and said subframe being spaced apart longitudinally of said vehicle, said subframe providing a forward portion of said endless track with an angular transition section below said main frame in the region where said track travels from a generally vertical disposition to a generally horizontal disposition along a lower run of said track.

2. A vehicle according to claim 1 wherein said drive sprocket means engages said endless track at one end portion of said track and an idler wheel means engages said track at an opposite end portion thereof, an idler axle mounting said idler wheel means, said idler axle being mounted on said subframe, said resilient suspension means interconnecting said main frame and said subframe in a manner such that on a hard, flat ground surface substantially all of said lower run of said track between said drive axle and said idler axle rearwardly of said angular transition section engages said surface.

3. A vehicle according to claim 1, including a prime mover on said main frame and interconnecting drive means interconnecting said prime mover on said main frame and said axle on said subframe in a manner enabling the upward deflection of said drive axle with said subframe relative to said main frame when said transition section encounters ground resistance.

4. A vehicle according to claim 3 wherein said interconnecting drive means includes means drivingly interconnecting said driven shaft on said main frame and said drive axle on said subframe, and articulated means pivotally interconnecting said main frame and said subframe for relative generally vertical movement therebetween about the axes of said drive axle and driven shaft while maintaining the driving interconnection therebetween.

5. A vehicle according to claim 4 wherein said interconnecting drive means includes a flexible, endless drive means, said main frame includes a longitudinal, downwardly open tunnel which encases all of said subframe, and said articulated means includes rigid means completely within said tunnel extending between said main frame and said subframe and pivotally mounted at one end thereof to said main frame for pivoting movement about the axis of said driven shaft and pivotally mounted at its other end to said subframe for pivotal movement about the axis of said drive axle, whereby said resilient suspension means enables relative generally vertical movement between said main frame and said subframe without substantial restraint from said interconnecting drive means.

6. A vehicle according to claim 3 wherein said subframe includes a pair of transversely spaced-apart bearing support arms extending longitudinally toward said drive axle, said bearing support arms being rigidly mounted to said subframe at their rearward ends and including bearing support means at their opposite ends for supporting said drive axle and said interconnecting drive means on said subframe, said bearing support arms being longitudinally adjustable to adjust the longitudinal position of said drive axle and therefore the tension of said track.

7. A vehicle according to claim 1 wherein said subframe includes a pair of longitudinally extending, transversely spaced apart upper slide rails and a pair of transversely spaced apart longitudinally extending lower slide rails for supporting said endless track, between said drive axle and an idler axle at opposite ends of said subframe, said drive axle mounting a pair of track drive sprockets for driving said track, said idler axle rotatably supporting a pair of idler wheels for engaging said track.

8. A vehicle according to claim 1 including an engine and drive transmission means on said main frame, and interconnecting drive means drivingly interconnecting said transmission means and said drive axle on said subframe, said drive means including a pivot tube pivotally encasing said driven shaft, a sleeve bearing encasing said pivot tube and rigidly mounted to said main frame, bearings journaling the opposite ends of said drive axle, bearing hubs for carrying each of said bearings, bearing support arms rigidly secured to said subframe having end portions defining annular bosses, said bearing hubs being journaled within said annular bosses, a pivot arm rigidly interconnecting one end of said pivot tube with one of said bearing hubs, and a pivot housing rigidly interconnecting the other end of said pivot tube with the other bearing hub.

9. An endless track vehicle comprising:

a main frame, a subframe mounting an endless track, resilient suspension means interconnecting said main frame and said subframe, a track drive sprocket means drivingly engaging said endless track, a drive axle mounting said track drive sprocket means, said drive axle being mounted on said subframe, engine and drive transmission means on said main frame, and interconnecting drive means for drivingly interconnecting said transmission means on said main frame and said drive axle on said subframe and enabling relative movement in a generally vertical direction between said subframe at said drive axle and said main frame, said transmission means including a driven shaft on said main frame, said interconnecting drive means including an endless flexible drive means drivingly interconnecting said driven shaft and said drive axle and a rigid articulated drive assembly pivotally interconnecting said main frame and said subframe about pivot axes coincident with the axes of said drive axle and said driven shaft, said articulated drive assembly including a pivot housing enclosing said endless flexible drive means at one side of said subframe, a pivot arm at the opposite side of said subframe, a pivot tube rigidly interconnecting said pivot housing and said pivot arm, said pivot tube rotatably mounting said driven shaft, and bearing means on said main frame rotatably mounting said pivot tube for pivoting movement about the axis of said driven shaft.

10. A vehicle according to claim 9 wherein said subframe includes first bearing means pivotally mounting said pivot housing and pivot arm to said subframe for movement about the axis of said drive axle, and second bearing means carried by said pivot housing and pivot arm rotatably mounting said drive axle.

11. An endless track vehicle comprising:
a main frame,
a subframe mounting an endless track,
resilient suspension means interconnecting said main frame and said subframe,
a track drive sprocket means drivingly engaging said endless track,
a drive axle mounting said track drive sprocket means, said drive axle being mounted on said subframe,
a prime mover on said main frame, and
interconnecting drive means interconnecting said prime mover on said main frame and said axle on said subframe in a manner enabling the upward deflection of said drive axle with said subframe relative to said main frame,
said resilient suspension means including a single-axis connection which directly connects said subframe to said main frame between the opposite ends of said subframe, and which together with said interconnecting drive means comprises the sole connection between said main frame and said subframe,
said prime mover being mounted at a forward end portion of said main frame,
said drive axle being at a forward end portion of said subframe, and
said drive means enabling both pivoting movement of said subframe relative to said main frame about said single-axis connection and generally vertical movement of said subframe as a unit relative to said main frame including said drive axle.

12. An endless track vehicle comprising:
a main frame,
a subframe mounting an endless track,
resilient suspension means interconnecting said main frame and said subframe,
a track drive sprocket means drivingly engaging said endless track,
a drive axle mounting said track drive sprocket means, said drive axle being mounted on said subframe,
said drive sprocket means engaging said endless track at one end portion of said track and an idler wheel means engaging said track at an opposite end portion thereof,
an idler axle mounting said idler wheel means, said idler axle being mounted on said subframe, and
a transverse suspension shaft on said main frame extending adjacent to said subframe and longitudinally between said driven axle and said idler axle, said resilient suspension means including torsion spring means connected to one end portion to said suspension shaft and at an opposite end portion to a lower forward portion of said subframe to interconnect said main frame and said subframe, said resilient suspension means also including swing arm means connected at one end to said suspension shaft and at an opposite end to a lower portion of said subframe, said torsion spring means and said swing arm means extending diagonally in opposite directions from said suspension shaft, the connections of said torsion spring means and said swing arm means to said subframe including lost motion connection means enabling upward movement of forward and rear portions of said subframe relative to said suspension shaft, said torison spring means acting in conjunction with said suspension shaft means to urge the spring-connected portion of said subframe downwardly, said swing arm means acting in conjunction with said suspension shaft means and said torsion spring means to urge the swing arm-connected portion of said subframe downwardly relative to said main frame.

* * * * *

UNITED STATES PATENT AND TRADEMARK OFFICE
CERTIFICATE OF CORRECTION

PATENT NO. : 4,301,884
DATED : November 24, 1981
INVENTOR(S) : Jerry L. Taylor

It is certified that error appears in the above—identified patent and that said Letters Patent is hereby corrected as shown below:

Column 6, line 49, "spring", first occurrence, should read -- springs --.

Column 6, line 59, "spring" should read -- springs --.

Column 7, line 41, "with" should read -- within --.

Column 7, line 65, "65" should read --64 --.

Signed and Sealed this

Thirtieth Day of March 1982

[SEAL]

Attest:

Attesting Officer

GERALD J. MOSSINGHOFF
Commissioner of Patents and Trademarks